(12) United States Patent
Fusegi et al.

(10) Patent No.: US 7,074,150 B2
(45) Date of Patent: Jul. 11, 2006

(54) DIFFERENTIAL GEAR MECHANISM

(75) Inventors: Masaaki Fusegi, Tochigi-Ken (JP); Masashi Aikawa, Tochigi-Ken (JP)

(73) Assignee: Miyoshi & Miyoshi, Minato-ku (JP)

( * ) Notice: Subject to any disclaimer, the term of this patent is extended or adjusted under 35 U.S.C. 154(b) by 0 days.

(21) Appl. No.: 11/202,922

(22) Filed: Aug. 11, 2005

(65) Prior Publication Data

US 2005/0277510 A1 Dec. 15, 2005

Related U.S. Application Data

(62) Division of application No. 10/121,154, filed on Apr. 10, 2002, now Pat. No. 6,945,895.

(30) Foreign Application Priority Data

| Apr. 12, 2001 | (JP) | ............................ P2001-113881 |
| Nov. 8, 2001 | (JP) | ............................ P2001-343262 |
| Nov. 20, 2001 | (JP) | ............................ P2001-354370 |
| Feb. 28, 2002 | (JP) | ............................ P2002-053741 |

(51) Int. Cl.
*F16H 48/20* (2006.01)

(52) U.S. Cl. ...................... 475/150; 475/231
(58) Field of Classification Search .............. 475/150, 475/231; 192/84.31, 84.92
See application file for complete search history.

(56) References Cited

U.S. PATENT DOCUMENTS

| 2,962,142 | A | | 11/1960 | Straus |
| 2,969,134 | A | * | 1/1961 | Wiedmann et al. ...... 192/84.92 |
| 3,084,776 | A | * | 4/1963 | Rabinow .................. 192/84.92 |
| 5,030,181 | A | * | 7/1991 | Keller ......................... 475/150 |
| 5,765,671 | A | * | 6/1998 | Endo et al. ............... 192/84.92 |
| 6,040,752 | A | * | 3/2000 | Fisher ......................... 335/234 |
| 6,460,677 | B1 | | 10/2002 | Roscoe |
| 6,699,151 | B1 | | 3/2004 | Grogg et al. |
| 2002/0019284 | A1 | | 2/2002 | Aikawa et al. |

FOREIGN PATENT DOCUMENTS

| JP | 64-022633 | 1/1989 |
| JP | 02-286942 | 11/1990 |
| JP | 02-286944 | 11/1990 |
| JP | 05-054574 | 3/1993 |
| JP | 11-189064 | 7/1999 |

* cited by examiner

*Primary Examiner*—Sherry Estremsky
(74) *Attorney, Agent, or Firm*—Morrison & Foerster LLP

(57) ABSTRACT

A differential gear mechanism includes a rotatable case driven by torque from an engine, a differential gear set housed in the case for differential distribution of the torque to a pair of output axes, comprising a first clutch, an annular plunger movable in a direction of the rotation axis and an annular electromagnetic actuator for actuation of the plunger in the direction of the rotation axis. The case further comprises a second clutch being slidable in the direction of the rotation axis and the second clutch is actuated by the plunger so as to be engaged with the first clutch.

16 Claims, 13 Drawing Sheets

DIFFERENTIAL GEAR MECHANISM

CROSS REFERENCE TO RELATED APPLICATION

This application is a division of application Ser. No. 10/121,154 filed on Apr. 10, 2002, now U.S. Pat. No. 6,945,895, the entire contents of which is incorporated herein by reference.

BACKGROUND OF THE INVENTION

1. Field of the Invention

This invention relates to a differential gear mechanism applied to automobiles whose transmission and intermission of torque is controlled by an electromagnetic means.

2. Description of the Related Art

Japanese Patent Examined Application (Kokoku) No. 5-54574 discloses a proposed differential gear mechanism.

The differential gear mechanism includes a differential gear, a drivable sleeve having a first clutch, and a rotatable outer case driven by torque from an engine. The outer case is further provided with a second clutch which is to be engaged with the first clutch thereby the torque is transferred from the engine to the differential gear. A part-time 4WD automobile having the differential gear mechanism has two driving mode of 4 WD and 2 WD.

SUMMARY OF THE INVENTION

The above described proposed differential gear mechanism needs a cylinder driven by hydraulic pressure of oil or air to drive the sleeve. The hydraulic or pneumatic cylinder is a relatively large apparatus compared with the differential gear so that the differential gear mechanism comes to be large.

A shift fork extended from the cylinder is slidably engaged with the sleeve. During the gear is rotating, the shift fork has to slide in contact with the sleeve so that the torque generated by the engine is exhausted and the output torque is affected by the sleeve movement.

The present invention has a purpose of providing a compact differential gear mechanism whose transmission and intermission of torque can be controlled with small reduction of the torque.

To solve the problem, the inventors get an idea of a compact electromagnetic actuator with a small electrical consumption and thought to apply the electromagnetic actuator to a differential gear mechanism. The present invention is completed by designing a suitable structure of the differential gear mechanism with the electromagnetic actuator.

A differential gear mechanism according to the present invention includes a rotatable case driven by torque from an engine, a differential gear set housed in the case for differential distribution of the torque to a pair of output axes, comprising a first clutch, an annular plunger movable in a direction of the rotation axis and an annular electromagnetic actuator for actuation of the plunger in the direction of the rotation axis. The case further comprises a second clutch being slidable in the direction of the rotation axis and the second clutch is actuated by the plunger so as to be engaged with the first clutch. Thereby the differential gear set is locked or the torque is transmitted to the differential gear set.

According to the constitution described above, the annular plunger is slidably contact with the annular second clutch in the rotating surface and the plunger pushes to actuate the second clutch. In contrast with the above described proposed differential gear mechanism whose shift fork and sleeve are engaged with each other and slide in its rotation direction, the output torque is less affected by the sliding friction drag. Therefore the electromagnetic actuator can be constituted smaller so that the differential gear mechanism comes to be compact. Sealing member can be omitted because hydraulic or pneumatic drives are needless to the mechanism, thereby the differential gear mechanism further comes to be compact. Furthermore the omission of the hydraulic or pneumatic drives assures the stable working in a case where the external pressure changes in a use at a high ground.

The differential gear mechanism according to the present invention more preferably includes a nonmagnetic annular member between the plunger and the second clutch, and a spring for applying a force to the annular member in a counter direction to a driving direction of the electromagnetic actuator.

According to the constitution described above, the electromagnetic actuator is constituted to drive the plunger only in one direction so as to be compact. The spring always applies a force to the annular member in the counter direction, thereby the annular member keeps its state in a case of the electromagnetic actuator failure. Therefore severe troubles such as the gear breakage happen hardly. Furthermore the magnetism leakage from the electromagnetic actuator is diminished and high electric efficiency is accomplished because the annular member is made of nonmagnetic material. The plunger is driven by smaller electric power.

The electromagnetic actuator according to the present invention further preferably includes an annular solenoid and a core surrounding the solenoid to leave a gap. The core and the plunger form a closed magnetic circuit.

According to the constitution described above, the magnetism forms a closed circuit so as to further diminish the leakage thereof. Therefore further higher electric efficiency is accomplished and the plunger is driven by smaller electric power.

The plunger is preferably constituted from a permanent magnet magnetized in its driving direction. The plunger can be driven bi-directionally by a current applied to the solenoid so that the spring can be omitted. Thereby the differential gear mechanism can be constituted more compact. The plunger keeps its position by a magnetic force thereof when the current applied to the solenoid is cut. The electric power can be saved because continuous excitation of the magnetism is needless. Furthermore severe troubles such as the gear breakage happen hardly in a case of the electromagnetic actuator failure.

DETAILED DESCRIPTION OF THE PREFERRED EMBODIMENT

[First Embodiment]

The first embodiment of the present invention will be described below with reference to FIG. 1 to FIG. 3.

Figure 1:
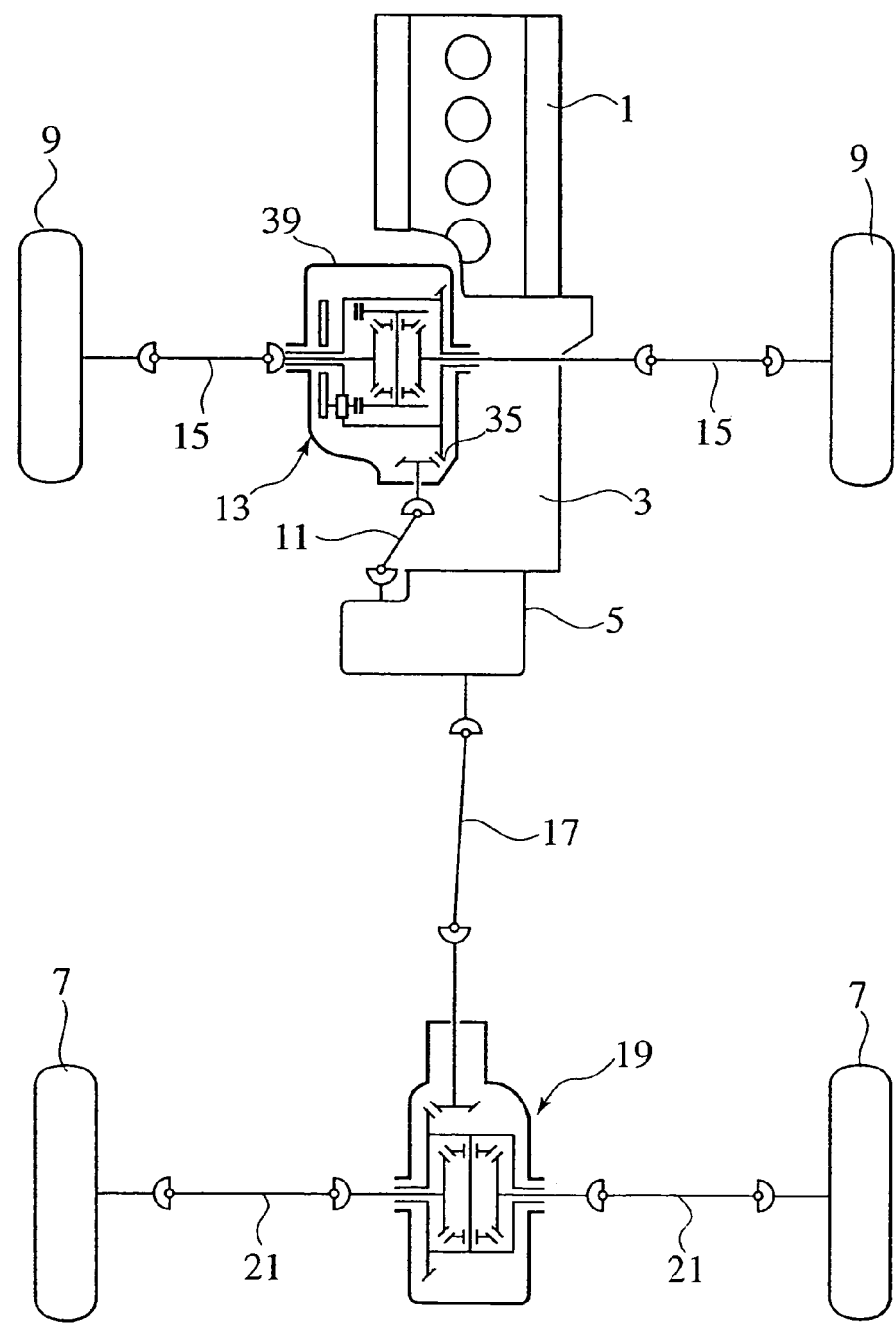
FIG. 1 is a plan view showing an automobile provided with a differential mechanism according to a first embodiment of the present invention.

As shown in FIG. 1, a torque of an engine 1 (a power source) is shared to rear wheels 7 and front wheels 9 via a transmission 3 and a power changeover device 5. The driving force to the front wheels 9 is inputted to a front differential 13 via a propeller shaft 11, and further, is shared to right and left front axles 15 so that the front wheels 9 are driven. On the other hand, the driving force to the rear wheels 7 is inputted to a rear differential 19 via a propeller shaft 17, and further, is shared to right and left rear axles 21 so that the rear wheels 7 are driven. As shown in FIG. 2, an outer case 31 (a first rotation body) of the front differential 13 is constructed in a manner that a case 31a and a cover 31b are fixed by a bolt 33. A ring gear 35 (see FIG. 1) is fixed to the outer case 31, and the driving force of the engine 1 is inputted to the ring gear 35 via a drive pinion so that the ring gear 35 is driven.

Further, the outer case 31 is rotatably supported in a stationary differential carrier 39 (see FIG. 1) by boss portions 31c and 31d at its both ends. In order to rotatably support the outer case 31 to the differential carrier 39, tapered roller bearings 81 are interposed between the boss portions 31a and 31d and the differential carrier 39.

A substantially short-cylindrical inner case 41 (a second rotation body) is provided coaxially with the case 31a so that it is rotatably supported in the inner periphery of the case 31a. The outer periphery of the inner case 41 is formed with an annular recess 44, and is supported to the case 31a at both sides of the annular recess 44. Moreover, a substantially short-cylindrical clutch 43 is arranged on the right side of the inner case 41.

Engaging and separable radial dog clutches 41a and 43a are formed between the inner case 41 and clutch 43, that is, the opposing surface between both members 41 and 43. Gear teeth of the dog clutches 41a and 43a are tapered so that they can be easily engaged with each other.

In the inner case 41, a pinion shaft 45 is integrated by a spring pin 47 so as to be perpendicular to its rotating axis. Two pinion gears 49 (one of them is not shown in FIG. 2) are rotatably arranged on the pinion shaft 45, and are engaged with a pair of opposing side gears 51 and 53.

An inner surface 41b of the inner case 41 receives a thrust of the pinion gear 49. Further, a washer 55 is interposed between the side gear 51 and the outer case 31 and between the side gear 53 and the outer case 31 so as to receive a thrust of the side gears 51 and 53. Further, a receiving washer 59 is interposed between the left end face of the inner case 41 and the opposing surface of the outer case 31 so as to receive a thrust of the clutch 43 when the dog clutch 43a engages with the dog clutch 41a.

The side gears 51 and 53 are spline-connected to the front axle 15 shown in FIG. 1. In the above manner, a differential gear set 57 is composed of the inner case 41, the pinion gear 49 and the side gears 51 and 53, and is not directly connected with the outer case 31 containing the above-mentioned members.

Figure 3:
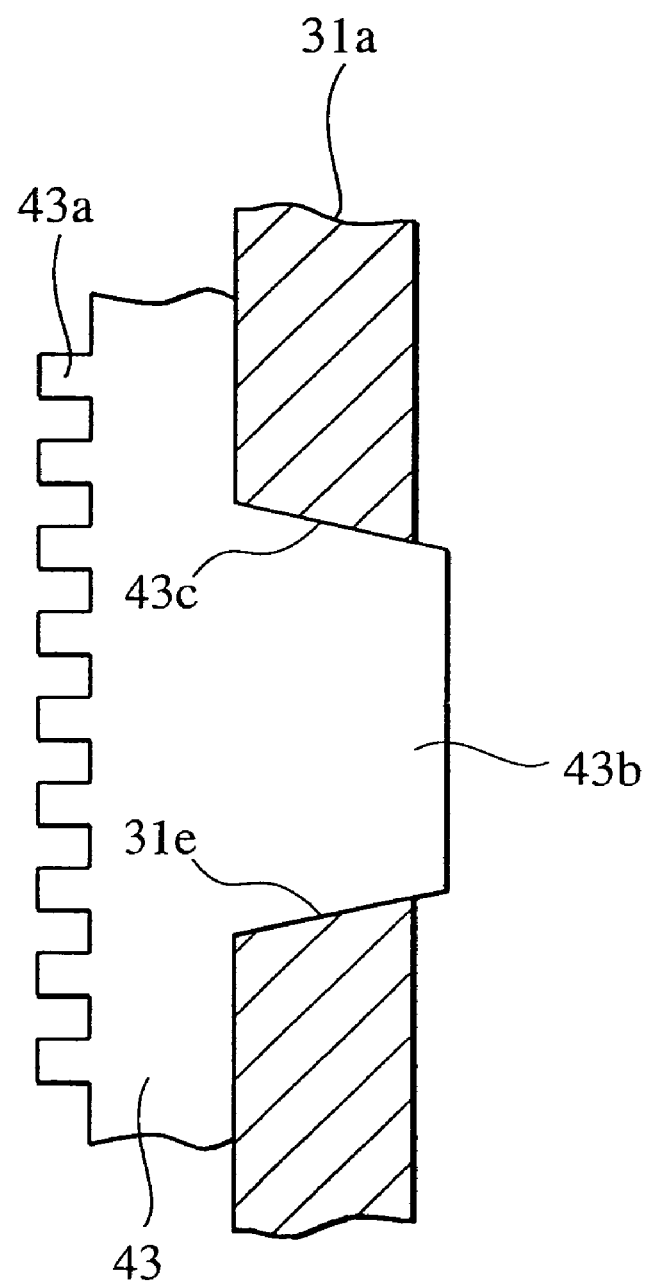
FIG. 3 is a cross-sectional view showing an engaging state of the clutch and the outer case according to the first embodiment of the present invention.

As shown in FIG. 3, the clutch 43 has four projected trapezoidal legs 43b, which are formed at equal intervals in the circumferential direction, at the end face (right end face) having no dog clutch 43a. The side surface 43c of the projected trapezoidal leg 43b is tapered toward the outside of the axial direction (right side in FIG. 3).

On the other hand, the right end wall of the case 31a of the outer case 31 is formed with a trapezoidal hole 31e at the position corresponding to the trapezoidal leg 43b of the clutch 43. By doing so, the trapezoidal legs 43b are fitted into the trapezoidal holes 31e in the axial direction, and then, the circumferential side surface 43c of the trapezoidal legs 43b is abutted against the edge of the trapezoidal hole 31e; therefore, the clutch 43 is always rotated integrally with the outer case 31. The edge of the trapezoidal hole 31e is inclined in parallel with the inclination of the circumferential side surface 43c of the leg 43b, as shown in FIG. 3.

Accordingly, when the outer case 31 rotates and drives the clutch 43, the clutch 43 is pushed to the inner case 41 side (left side of FIG. 2) by the inclination of the circumferential side surface 43c of the leg 43b, so that the dog clutches 41a and 43a can be readily engaged with each other. In this manner, the clutch 43 is fitted in the outer case 31 so as to be movable to the axial direction.

A right-hand outer side of the outer case 31 is provided with an electromagnetic actuation means 61. The electromagnetic actuation means 61 includes an electromagnet 63, a plunger 65, an annular member 67 and a return spring 69.

The electromagnet 63 has a solenoid 63a and a core 63b arranged outside the solenoid 63a, and is fixed to a vehicle body side by a bracket 71 leaving a gap between the bracket 71 and the vehicle body so that leakage of the magnetic field to the vehicle body is prevented. Further, the electromagnet 63 is formed as a whole into a shape of ring surrounding the right-hand boss portion 31c of the case 31a and the core 63b is formed to have an annular gap facing to the rotation axis.

The plunger 65 is formed into a shape of ring, and arranged on the inner peripheral side of the electromagnet 63 facing to the annular gap of the core 63b to form a magnetic path with the core 63b. An annular member 67 is attached to the inner peripheral surface of the plunger 65 in a state of being engaged with there. More specifically, the inner peripheral surface of the plunger 65 is formed with a projection 65a, and the annular member 67 is engaged with the projection 65a to be positioned regarding to the axis direction. By doing so, the plunger 65 is positioned outside the annular member 67 coaxially with the annular member 67.

The entirety of the annular member 67 is made of a non-magnetic material. Further, the annular member 67 contacts with the outer peripheral surface of the boss portion 31c of the case 31, and thereby, is positioned coaxially with the boss portion 31c. The plunger 65 is in a state of being engaged with the outer periphery of the annular member 67; therefore, the plunger 65 is indirectly positioned coaxially with the boss portion 31c via the annular member 67.

As described above, the electromagnet 63, the plunger 65 and the annular member 67 are all formed into the shape of ring, and the annular member 67 is indirectly positioned coaxially with the boss portion 31c of the case 31a. By doing so, the electromagnetic actuation means 61 has a structure of being inserted in the boss portion 31c and coaxial with the front axle 15 (see FIG. 1) spline-connected to the side gear (boss portion?) 53 of the inner case 41.

Further, the annular member 67 is capable of reciprocating to the axial direction of the boss portion 31c in a state of contacting with the outer peripheral surface of the boss portion 31c. In order to prevent the annular member 67 from coming off the boss portion 31c by the reciprocation, the boss portion 31c is attached with a stopper plate 75.

Moreover, a retainer 73, which is abutted against the leg 43b (see FIG. 3) of the clutch 43, is interposed between the annular member 67 and the clutch 43. The retainer 73 is abutted against the leg 43b of the clutch 43, and thereby, pushing and moving the dog clutch 43 to the engaging direction of the dog clutches 43a and 41a.

Further, the retainer 73 is bent to the axial direction of the clutch 43, and is extended upwardly. By doing so, the retainer is formed with a latch 73a, which is engaged with a recess 43e of the clutch 43. As described above, the latch 73a is engaged with the clutch 43, and thereby, the retainer 73 takes the clutch 43 to the same direction when moving to a direction separating from the inner case 41; therefore, it is possible to release the engagement of the dog clutches 41a and 43a.

The return spring 69 is interposed between the retainer 73 and the case 31a of the outer case 31 so as to urge the retainer 73 to a direction of releasing the engagement of the dog clutches 41a and 43a. Thus, when the electromagnet 63 is not driven, the engagement of the dog clutches 41a and 43a is released by the return spring 69.

Figure 2:
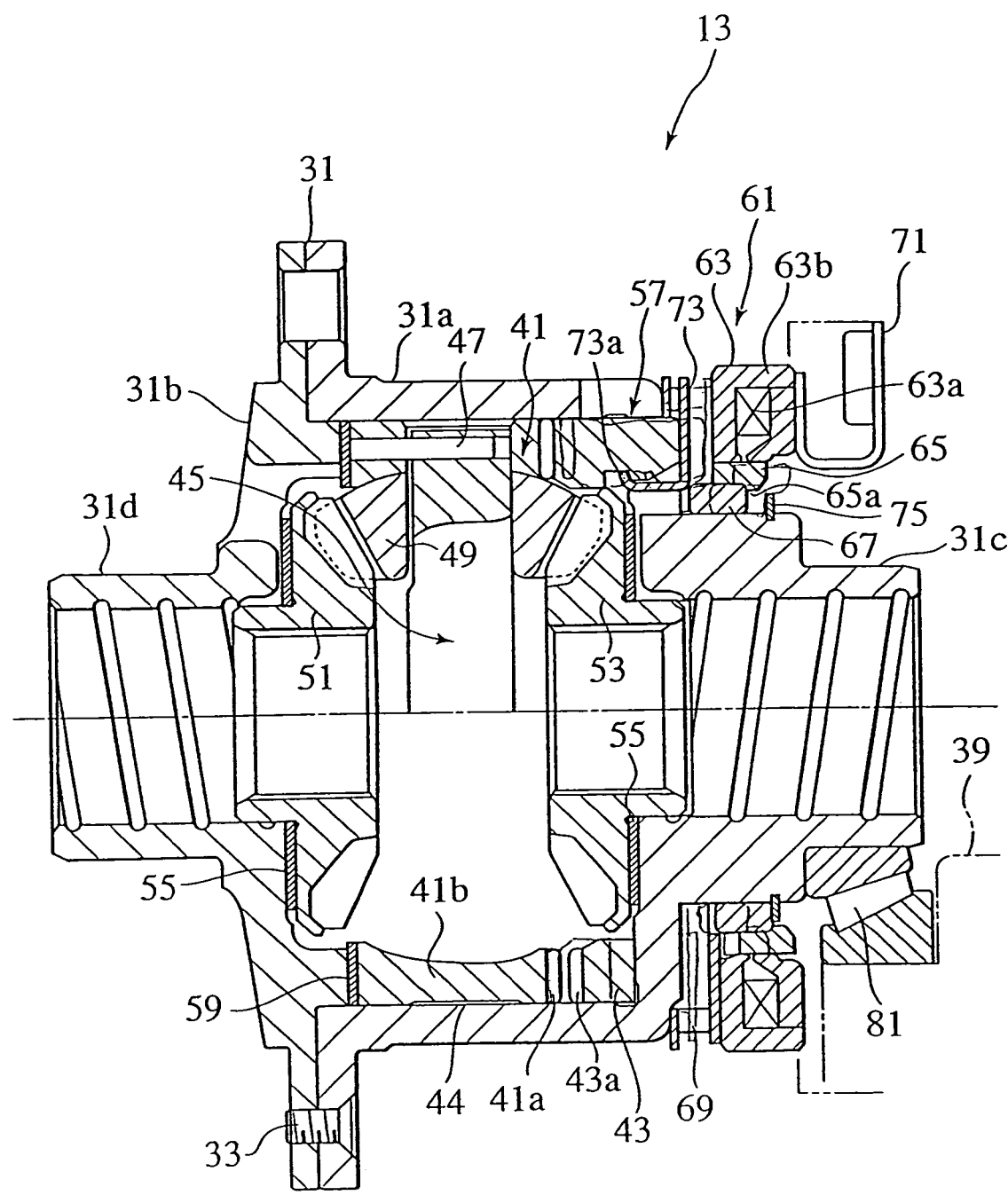
FIG. 2 is a cross-sectional view showing the differential mechanism according to the first embodiment of the present invention.

The upper half side of FIG. 2 shows a state that the dog clutches 41a and 43a are engaged with each other; on the other hand, the lower half side of FIG. 2 shows a state that the dog clutches 41a and 43a are separated from each other.

When a current is applied to the electromagnet 63, a magnetic path passing through the core 63b and the plunger 65 is formed, and then, the plunger 65 is moved to the left-hand side in the axial direction. By the movement, the annular member 67 engaging with the plunger 65 is integrally moved to the same direction as above, and thereby, the annular member 67 pushes the retainer 73. By doing so, the clutch 43 is moved to the left-hand direction, and then, the dog clutch 43a of the clutch 43 is engaged with the dog clutch 41a of the inner case 41. Thus, the outer case 31 and the inner case 41 provided therein are integrally rotated via the clutch 43. In this case, the receiving washer 59 receives a thrust of the inner case 41 when the dog clutches 41a and 43a are engaged with each other because it contacts with these dog clutches.

When the current application to the electromagnet 63 is stopped, the retainer 73 is moved to the left-hand side in the axial direction by the urging force of the return spring 69 together with the clutch 43. For this reason, the engaging dog clutches 41a and 43a are separated from each other. Therefore, the outer case 31 and the inner case 41 provided therein are rotatable independently from each other.

In the case of this vehicle, when the driving state is changed from a four-wheel driving state to a two-wheel driving state by the electromagnetic actuator 61 according to the present invention, the driving force from the engine to the front wheel side is cut off by the power changeover device 5. Then, the driving force of the engine 1 is used to drive only rear wheels 7 via the propeller shaft 17 and the rear differential 19.

Thereafter, so long as the two-wheel driving state is kept, the differential gear set 57 of the front differential 13 has idling by the front wheels 9 via the driving path reverse to the four-wheel driving so far. In this case, however, with the changeover to the two-wheel drive, the engagement of the dog clutches 41a and 43a is released by the return spring 69, so that the clutch 43, the outer case 31 and the ring gear 35 have no idling. Therefore, it is possible to reduce an energy loss and the generation of noise by the running resistance of these idling members.

According to the above first embodiment, the electromagnetic actuation means 61 has the structure of moving the clutch 43 to the axial direction so that the dog clutches 41a and 43a are disconnected and connected, and the driving state is changed by controlling the current application; therefore, it is possible to miniaturize an actuator. Further, there is no need of considering a fluid leakage, and no seal member for preventing the fluid leakage is required, so that the number of components can be reduced, the structure can be simplified, and assembling can be readily performed.

The core 63c and the plunger 65 compose a closed magnetic circuit so that magnetic loss by leakage of the magnetic field from the electromagnet 63 to the outer case 31 is minimized. Thereby the electric power to switch the driving mode is saved.

Further, there is no need of providing sliding parts such as actuator driving by fluid pressure; therefore, it is possible to reduce a sliding resistance, and an influence to output torque.

Further, the electromagnetic actuation means 61 is formed into the shape of ring so that it is arranged coaxially with the front axle 15; therefore, it is possible to apply the driving force from the entirety of the ring shape. As a result, the clutch 43 can be driven by a great force, and a stable drive can be performed. In addition, in the above ring shape, the layout passing the front axle 15 is possible; therefore, a preferable balance can be obtained.

Moreover, according to the above first embodiment, the inner peripheral surface of the plunger 65 is provided with the annular member 67 made of non-magnetic material, and thereby, the plunger 65 made of magnetic material has no contact with the outer case 31, the retainer 73 and the like. Therefore, the magnetic path can be formed at the shortest distance without leaking a magnetic force. As described above, no leakage of the magnetic force is generated; therefore, it is possible to effectively form the magnetic path. As a result, there is no need of making large a current supplied to the electromagnetic actuation means 61, so that power saving can be achieved.

Further, the plunger 65 is coaxially positioned by the annular member 67; therefore, the structure for positioning the plunger 67 can be simplified.

Further, the annular member 67 is coaxially positioned by the boss portion 31c of the outer case 31; therefore, no member for positioning the annular member is required, and the structure can be simplified and miniaturized.

[Second Embodiment]

The second embodiment of the present invention will be described below with reference to FIG. 4. In this second embodiment, the same elements as the above first embodiment are referenced with the same numerals and the detailed descriptions are omitted. Mainly differences are described below.

In this second embodiment, the core 63b of the electromagnet 63 of the electromagnetic actuation means 61 is formed into a shape of U-letter in its cross section, and has an opening at the end face on the position separating from the clutch 43. Further, the retainer 73 is formed integrally with a support plate 77, which extends to a direction far from the clutch 43. The support plate 77 is attached with the plunger 65.

The plunger 65 is formed into a shape of ring, and is fixed to the surface on the clutch 43 side of the support plate 77. Further, the plunger 65 is formed into a dimension capable of coming in and out the aperture 63c of the core 63b, and is fixed to the support plate 77 so as to correspond to the position of the aperture 63c.

In addition, the core 63b is partially formed with a drain hole 79 for air or oil vent.

The return spring 69 is interposed between the retainer 73 and the case 31a of the outer case 31, and is used for urging the retainer 73 to a direction of releasing the engagement of the dog clutches 41a and 43a. Therefore, when the electromagnet 63 is not driven, the dog clutches 41a and 43a are disconnected by the return spring 69.

Figure 4:
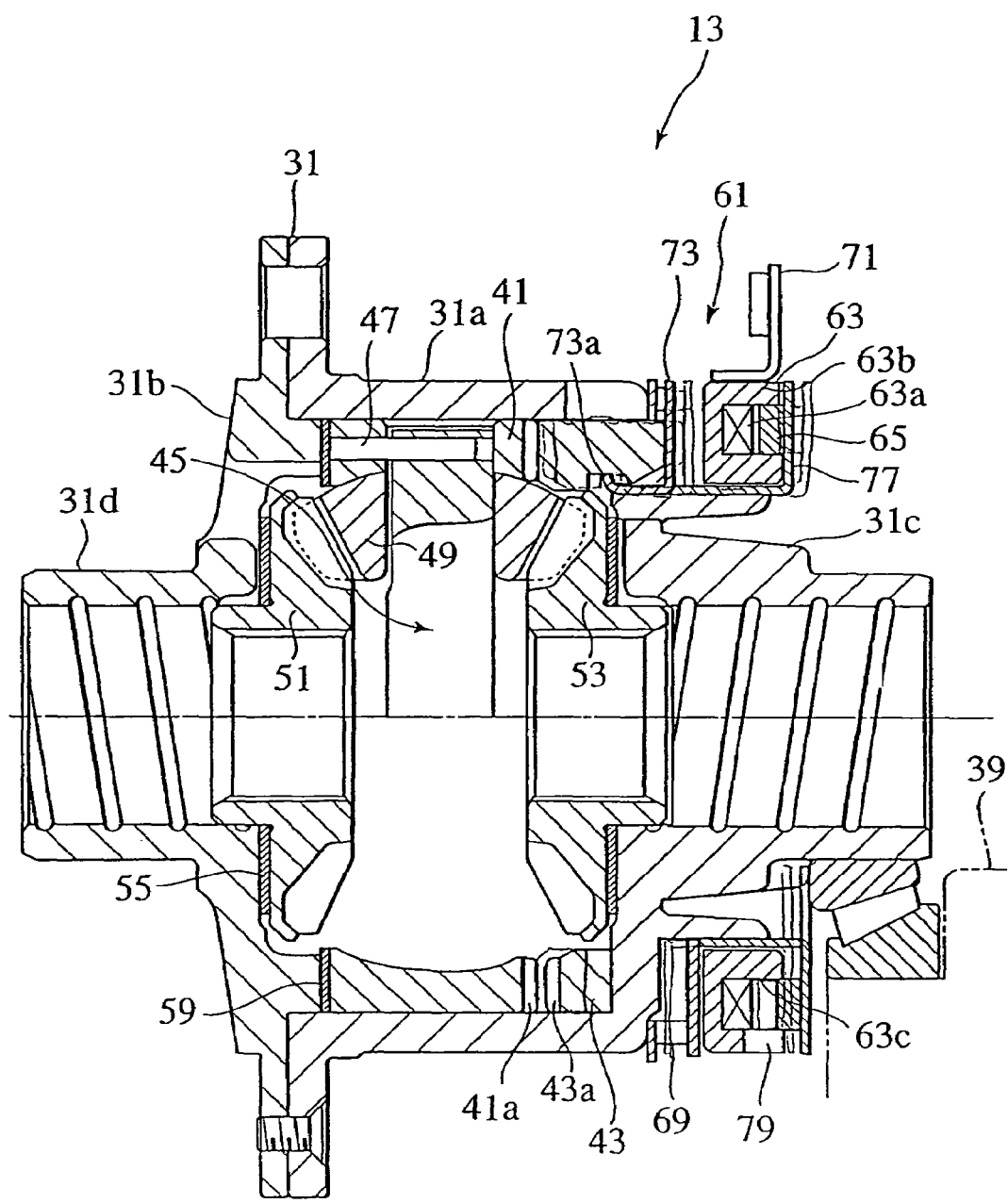
FIG. 4 is a cross-sectional view showing the differential mechanism according to a second embodiment of the present invention.

The upper half side of FIG. 4 shows a state (four-wheel driving state) that the dog clutches 41a and 43a are engaged with each other; on the other hand, the lower half side of FIG. 4 shows a state (two-wheel driving state) that the dog clutches 41a and 43a are separated from each other.

When a current is applied to the electromagnet 63, a magnetic path passing through the core 63b and the plunger 65 is formed, and then, the plunger 65 is moved to the left-hand side in the axial direction. By the movement, the support plate 77 and the retainer 73 fixing the plunger 65 is integrally moved to the same direction as above. By doing so, the clutch 43 is moved to the left-hand direction, and then, the dog clutch 43a of the clutch 43 is engaged with the dog clutch 41a of the inner case 41. Thus, the outer case 31 and the inner case 41 provided therein are integrally rotated via the clutch 43 (four-wheel driving state). In this case, the receiving washer 59 receives a thrust of the inner case 41 when the dog clutches 41a and 43a are engaged with each other because it contacts with these dog clutches.

When the current application to the electromagnet 63 is stopped, the retainer 73 is moved to the right-hand side in the axial direction by the urging force of the return spring 69 together with the clutch 43. For this reason, the engaging dog clutches 41a and 43a are separated from each other. Therefore, the outer case 31 and the inner case 41 provided therein are rotatable independently from each other.

As described above, in this second embodiment, when no current is applied to the electromagnet 63, the engagement of the dog clutches 41a and 43a is released so that the two-wheel driving state can be obtained. As the need arises, the dog clutches 41a and 43a are engaged with each other so that the four-wheel driving state can be obtained. Therefore, it is possible to keep the two-wheel driving state and to improve a running (driving) performance on the paved road even if the electromagnet 63 has a failure.

In a state that the plunger 65 comes into the aperture 63c of the core 63b, a clearance is kept between the solenoid 63a of the core 63b and the coming plunger 65. In the structure capable of keeping the clearance, a sliding resistance becomes small; therefore, it is possible to reduce an influence to torque.

Further, in this second embodiment, no annular member 67 is provided; therefore, the number of components can be reduced, and the structure can be simplified. In addition, the structure is provided such that the plunger 65 comes into the core 63b; therefore, the actuating space becomes small, and miniaturization can be achieved.

Figure 5:
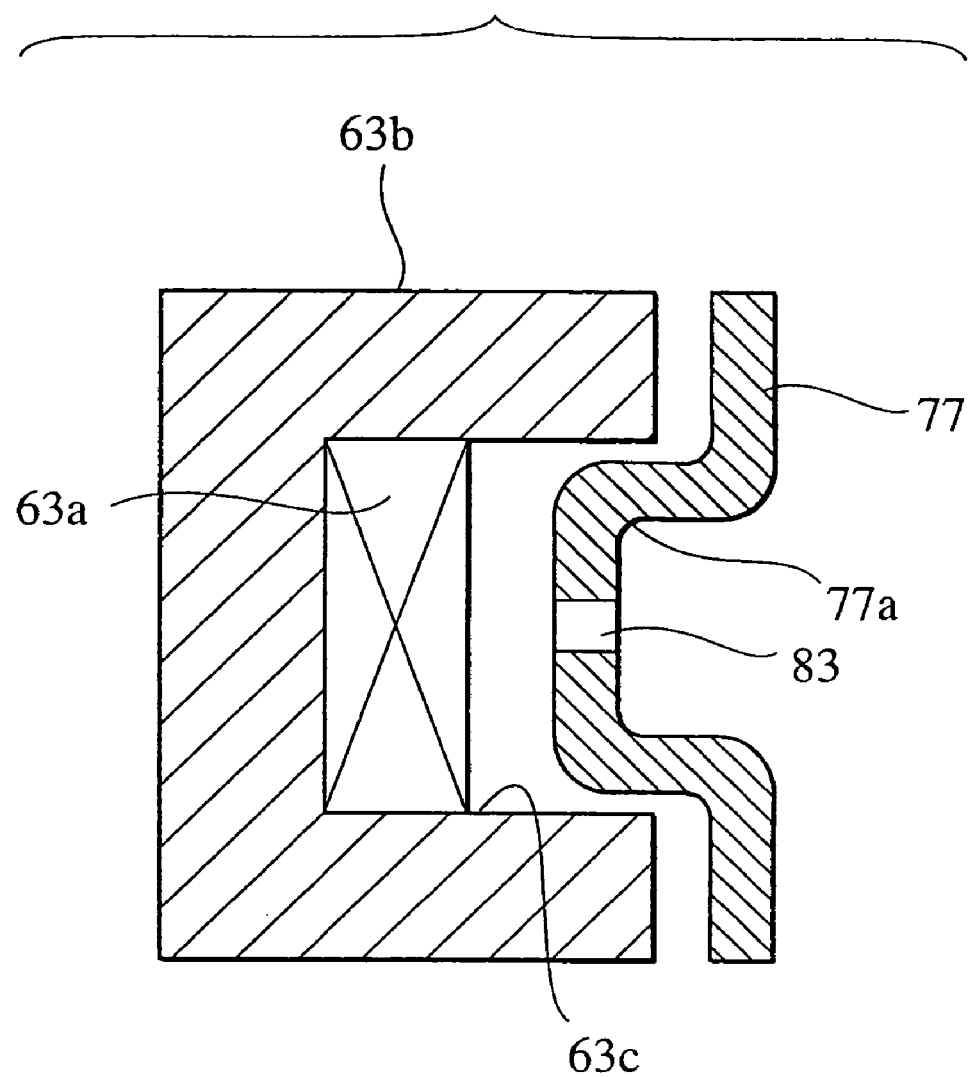
FIG. 5 is a cross-sectional view showing the differential mechanism according to a modification of the second embodiment of the present invention.

FIG. 5 shows a modification example of the support plate 77 of the second embodiment.

In this modification example, the support plate 77 or the retainer 73 having the support plate 77 is formed of a magnetic material. Further, in place of the plunger 65, the support plate 77 is formed with a projection 77a, which is capable of coming into the aperture 63c, at the position corresponding to the aperture 63c of the core 63b. Therefore, when a current is applied to the solenoid 63a, the projection 77a is moved to a direction of coming into the aperture 63c, and thereby, the dog clutches 41a and 43a can be engaged with each other by the above movement.

In addition, the projection 77a of the modification example is formed with a drain hole 83 for air or oil vent.

[Third Embodiment]

The third embodiment of the present invention will be described below with reference to FIG. 6. In this third embodiment, the same elements as the above embodiments are referenced with the same numerals and the detailed descriptions are omitted. Mainly differences are described below.

In this third embodiment, the core 63b of the electromagnet 63 of the electromagnetic actuation means 61 is formed into a shape of U-letter in its cross section, and has an opening at the end face on the clutch 43 side. Further, the retainer 73 is formed with a plunger 65, which is formed into a shape of ring.

The plunger 65 is formed into a dimension capable of coming in and out the aperture 63c of the core 63b, like the above second embodiment, and is fixed to the retainer 73 so as to correspond to the position of the aperture 63c.

In addition, the core 63b is partially formed with a drain hole 79 for air or oil vent.

The return spring 69 is interposed between the case 31a and the clutch 43 in the outer case 31, and is used for urging the retainer 73 to an engaging direction of the dog clutches 41a and 43a. Therefore, when the electromagnet 63 is not driven, the dog clutches 41a and 43a are connected by the return spring 69.

Figure 6:
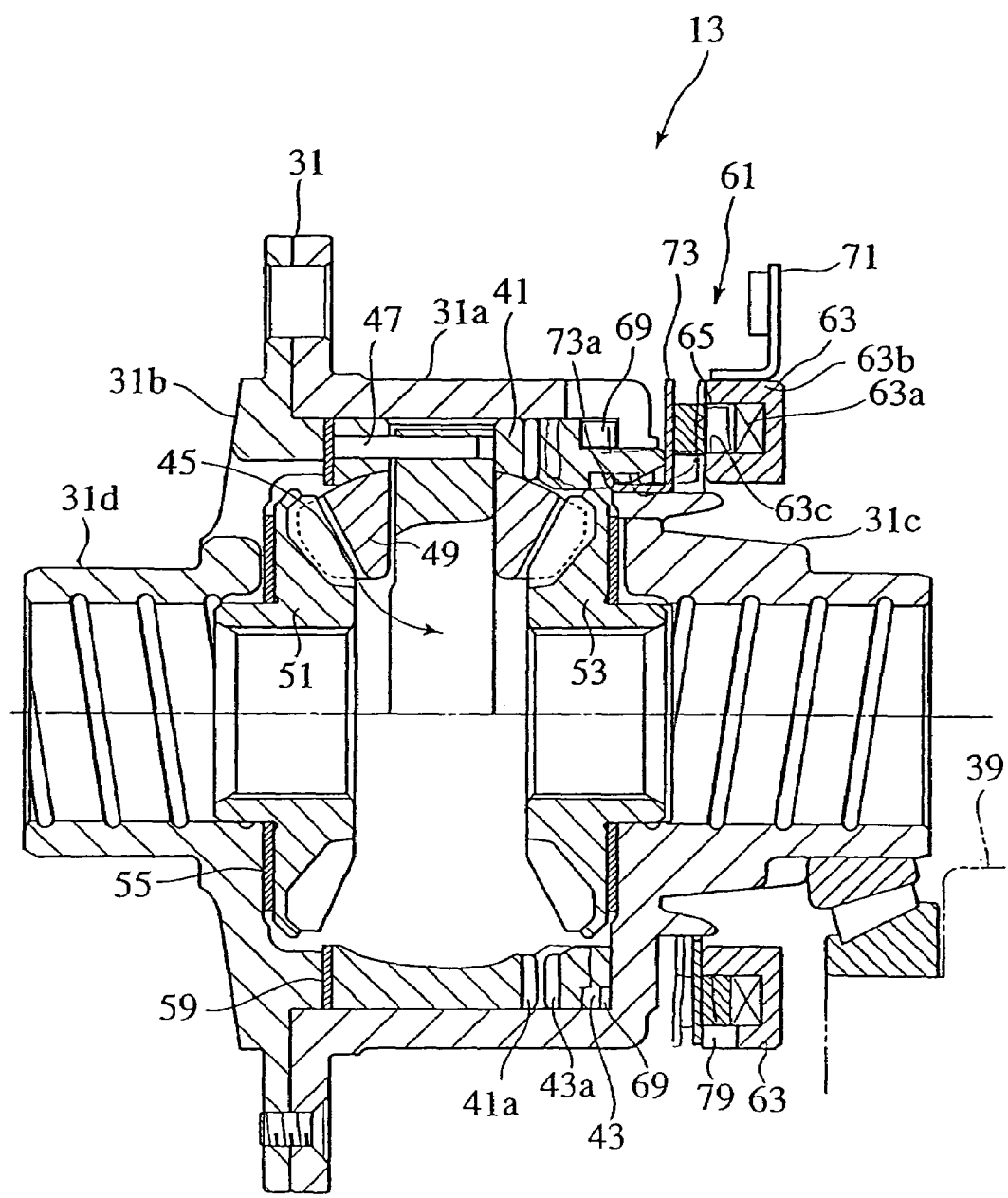
FIG. 6 is a cross-sectional view showing the differential mechanism according to a third embodiment of the present invention.

The upper half side of FIG. 6 shows a state (four-wheel driving state) that the dog clutches 41a and 43a are engaged with each other; on the other hand, the lower half side of FIG. 6 shows a state (two-wheel driving state) that the dog clutches 41a and 43a are separated from each other.

In this third embodiment, when the current application to the electromagnet 63 is stopped, the retainer 73 usages the clutch 43 to the left-hand side in the axial direction by the urging force of the return spring 69. By doing so, the dog clutch 43a of the clutch 43 is kept in a state of engaged with the dog clutch 41a of the inner case 41, and thus, the outer case 31 and the inner case 41 provided therein are integrally rotated via the clutch 43 (four-wheel driving state). In this case, the receiving washer 59 receives a thrust of the inner case 41 when the dog clutches 41a and 43a are engaged with each other because it contacts with these dog clutches.

When a current is applied to the electromagnet 63, a magnetic path passing through the core 63b and the plunger 65 is formed, and then, the plunger 65 is moved to the right-hand side in the axial direction. By the movement, the retainer 73 fixing the plunger 65 is integrally moved to the same direction as above, and then, the clutch 43 is moved to the right-hand direction; as a result, the engaging dog clutches 41a and 43a of the clutch 43 are separated from each other. Therefore, the outer case 31 and the inner case 41 provided therein are rotatable independently from each other.

As described above, in this third embodiment, when no current is applied to the electromagnet 63, the engagement of the dog clutches 41a and 43a are engaged with each other so that the four-wheel driving state can be obtained. As the need arises, the engagement of the dog clutches 41a and 43a is released so that the two-wheel driving state can be obtained. Therefore, it is possible to keep the four-wheel driving state and to improve a driving performance on rough road even if the electromagnet 63 has a failure.

Like the above second embodiment, in a state that the plunger 65 comes into the aperture 63c of the core 63b, a clearance is kept between the solenoid 63a of the core 63b and the coming plunger 65. In the structure capable of keeping the clearance, a sliding resistance becomes small; therefore, it is possible to reduce an influence to torque.

Further, in this third embodiment, no annular member 67 is provided; therefore, the number of components can be reduced, and the structure can be simplified. In addition, the structure is provided such that the plunger 65 comes into the core 63b; therefore, the actuating space becomes small, and miniaturization can be achieved.

Further, in this third embodiment, the support plate 77 or the retainer 73 having the support plate 77 may be formed of a magnetic material, like the above second embodiment. Further, in place of the plunger 65, the support plate 77 may be formed with a projection 77a, which is capable of coming into the aperture 63c, at the position corresponding to the aperture 63c of the core 63b.

[Fourth Embodiment]

Figure 7:
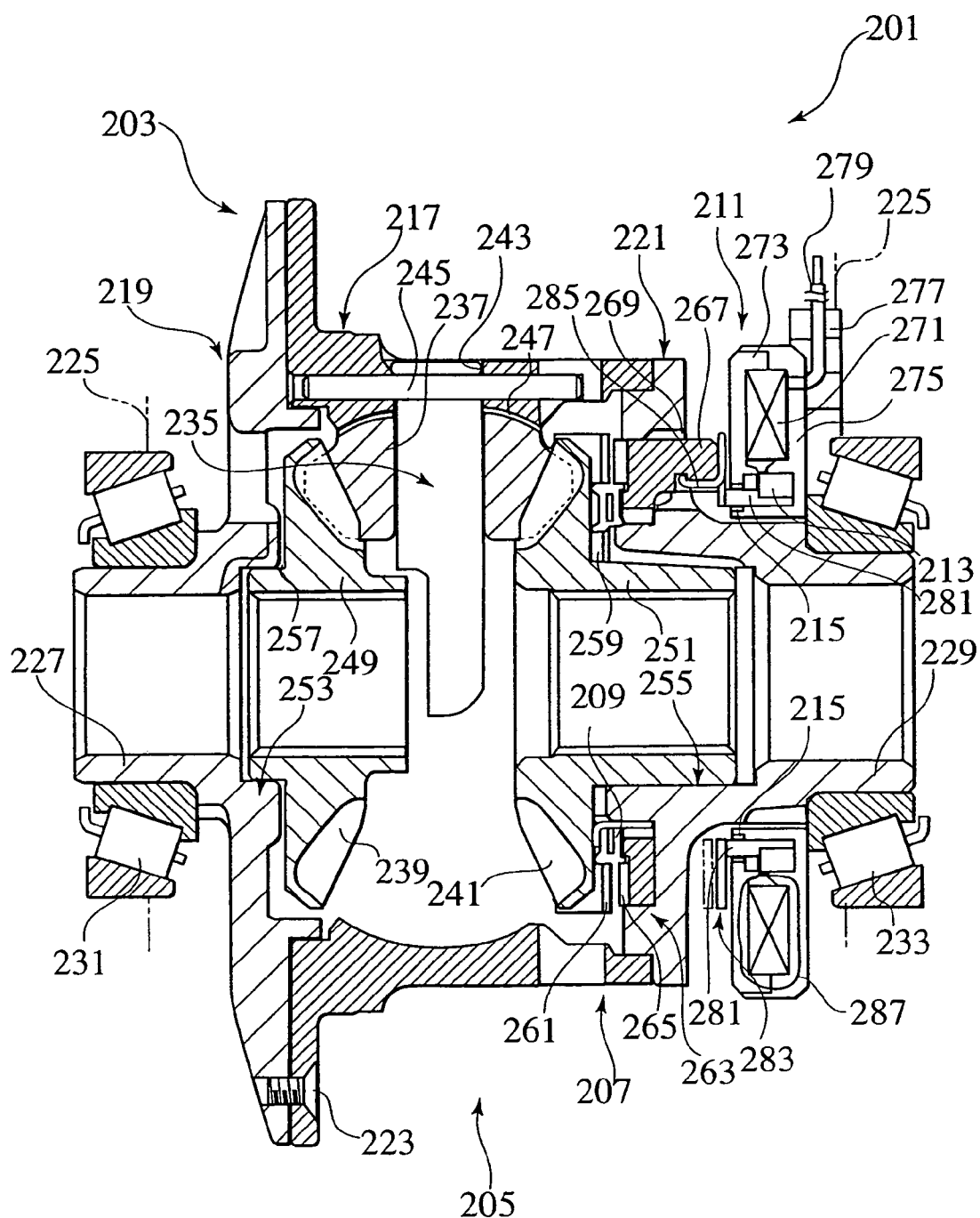
FIG. 7 is a cross-sectional view showing the differential mechanism according to a fourth embodiment of the present invention.

The fourth embodiment of the present invention will be described below with reference to FIG. 7. In this fourth embodiment, the same elements as the above embodiments are referenced with the same numerals and the detailed descriptions are omitted. Mainly differences are described below.

A differential gear mechanism 201 of this embodiment is used to front wheels side of front wheels-drive vehicle, to rear wheels-drive vehicle, or to a center differential gear.

The differential gear mechanism 201 is composed of a case 203, a bevel gear type differential gear set 205, a dog clutch 207, a return spring 209, an electromagnet 211 (electromagnetic actuation means), a plunger 213, an O-ring 215 and the like.

The case 203 is composed of a case 217 and left and right covers 219 and 221 in which the case 217 and the left cover 219 are fixed by a bolt 223 and the case 217 and the right cover 221 are welded.

The case 203 is arranged in a differential carrier 225, and boss portions 227 and 229 formed in covers 219 and 221 are supported to the differential carrier 225 via tapered roller bearings 231 and 233, respectively.

The differential carrier 225 is formed with an oil reservoir.

In the case 203, a ring gear is fixed by a bolt, and the ring gear is engaged with an output gear of power transmission system. The power transmission system is connected to a transfer side, and the case 203 is rotated and driven by a driving force of engine transmitted via the transfer and the power transmission system.

The differential gear set 205 is composed of a pinion shaft 235, a pinion gear 237 supported on the pinion shaft 235, and output side gears 239 and 241.

The pinion shaft 235 has one end portion, which is fitted into a through hole 243 formed in a case 217, and is fixed by a spring pin 245. The side gears 239 and 241 are engaged with the pinion gear 237 from left and right.

A spherical washer 247 is interposed between the case 203 and the pinion gear 237, and is used for receiving a centrifugal force of the pinion gear 237 and an engagement reaction force generated by the engagement of the side gears 239 and 241.

The boss portions 249 and 251 of the side gears 239 and 241 are supported by supports 253 and 255 formed in the covers 219 and 221, respectively, and are connected to right and left wheels via the spline-connected axle.

A thrust washer 257 is interposed between the left side gear 239 and the case 203 so as to receive an engagement thrust of the side gear 239; on the other hand, a thrust washer 259 is interposed between the right side gear 241 and the case 203 so as to receive an engagement thrust of the side gear 241.

A dog clutch 207 is composed of gear teeth 261 formed in the right side gear 241, and gear teeth 265 formed in a clutch ring 263.

The clutch ring 263 is formed with leg portions 267 at equal intervals in the circumferential direction. Further, the clutch ring 263 is self-locked in the case 203 in a manner that the leg portions 267 are fitted into the openings 269 formed in the cover 221 at equal intervals in the circumferential direction, and thus, is arranged so that it is freely movable in the axial direction.

When the clutch ring 263 is moved to the left side, the dog clutch 207 is engaged with there so that the differential motion of the differential gear set 205 is locked. As shown in FIG. 7, when the clutch ring 263 is moved to the right side, the engagement of the clutch 207 is released, and thus, the differential lock is released.

The return spring 209 is interposed between the right side gear 241 and the clutch ring 263, and is used for urging the clutch ring 263 to the side releasing the engagement of the dog clutch 207 (right side).

The electromagnet 211 is composed of a solenoid 271 and a pair of cores 273 and 275 integrated so as to hold the solenoid from right and left.

The core 275 is fixed to the differential carrier 225 via a linkage member 277. A wire 279 of the solenoid 271 is led to the outside of the differential carrier 225, and is connected to an onboard battery via a controller.

A plunger 213 is made of a magnetic material, and is arranged in the cores 273 and 275 so that it is freely movable in the axial direction. The plunger 213 is formed with push portions 281 at equal intervals in the circumferential direction. Each push portion 281 penetrates through the core 273 via the O-ring 215, and projects into the left side.

The clutch ring 263 of the dog clutch 207 pushes each push portion 281 and the plunger 213 by the urging force of the return spring 209 via a sliding plate 283. The sliding plate 283 is connected to a rotating side clutch ring 263 by an arm 285, and is used for absorbing a sliding motion between a stationary side plunger 213 and the push portion 281.

A magnetic path of the electromagnet 211 is formed by the cores 273 and 275 and the plunger 213, and the plunger 213 functions as an armature. The electromagnet 211, the core 75, the plunger 213 and the clutch ring 263 substantially have the same constitutions and the same functions as those of the second embodiment and the details are referenced to the descriptions of the second embodiment.

The controller carries out the control for excitation to the electromagnet 211 and excitation stop.

When the electromagnet 211 is excited, a magnetic loop 287 is generated in the magnetic path, and then, the plunger 213 is moved to the left side while warping the return spring 209. By doing so, the clutch ring 263 is moved so as to engage with the dog clutch 207, so that the differential motion of the differential gear set 205 can be locked as described above.

During the driving on rough road, that is, under the condition that right and left driving wheels are easy to idle, when the differential motion is locked, the driving force is prevent from releasing from the idling wheel; as a result, escape from rough road and running through performance can be improved.

On the other hand, when the excitation to the electromagnet 211 is stopped, the clutch ring 263 and the plunger 213 are returned to the right side by the return spring 209, so that the engagement of the dog clutch 207 can be released.

According to the above fourth embodiment, the electromagnet 211 has the structure of moving the clutch ring 263 to the axial direction so that the dog clutch 207 is disconnected and connected, and the driving state is changed by controlling the current application; therefore, it is possible to miniaturize an actuator. Further, there is no need of considering a fluid leakage, and no seal member for preventing the fluid leakage is required, so that the number of components can be reduced, the structure can be simplified, and assembling can be readily performed.

Further, there is no need of providing sliding parts such as actuator driving by fluid pressure; therefore, it is possible to reduce a sliding resistance, and an influence to output torque.

Further, the electromagnet 211 is formed into the shape of ring so that it is arranged coaxially with the differential gear mechanism 201; therefore, it is possible to apply the driving force from the entirety of the ring shape. As a result, the clutch ring 263 can be driven by a great force, and a stable drive can be performed. In addition, in the above ring shape, the layout passing the axle is possible; therefore, a preferable balance can be obtained.

Moreover, according to the above fourth embodiment, the plunger 213 is contained in the cores 273 and 275 of the electromagnet 211, and the cores 273 and 275 supported to the differential carrier 225 has no contact with the case 203. Therefore, the magnetic path can be formed at the shortest distance without leaking a magnetic force.

Further, as described above, no leakage of the magnetic force is generated; therefore, it is possible to effectively form the magnetic path. As a result, there is no need of making large a current supplied to the electromagnet 211, so that the battery power can be saved.

Further, the plunger 213 is supported by the cores 273 and 275 of the electromagnet 211; therefore, it is possible to readily carry out clearance adjustment between the cores 273; 275 and the plunger 213. As a result, it is possible to reduce a magnetic force loss between these members and a sliding resistance to the minimum limit.

Further, the plunger 213 is coaxially positioned by the cores 273 and 275; therefore, the plunger 213 can be positioned with a simple structure.

Further, no contamination such as magnetic metal powder contained in the oil is attracted to the solenoid 271 by the O-ring 215 interposed between the core 273 and the plunger 213. Therefore, it is possible to prevent a failure of the movement of the plunger 213 and a failure of the operation of the dog clutch 207 in the case where the magnetic metal powder jams; as a result, a normal operation can be maintained for a long period.

Incidentally, the cores 273 and 275 may be supported to the case 203 by bearing.

[Fifth Embodiment]

Figure 8:
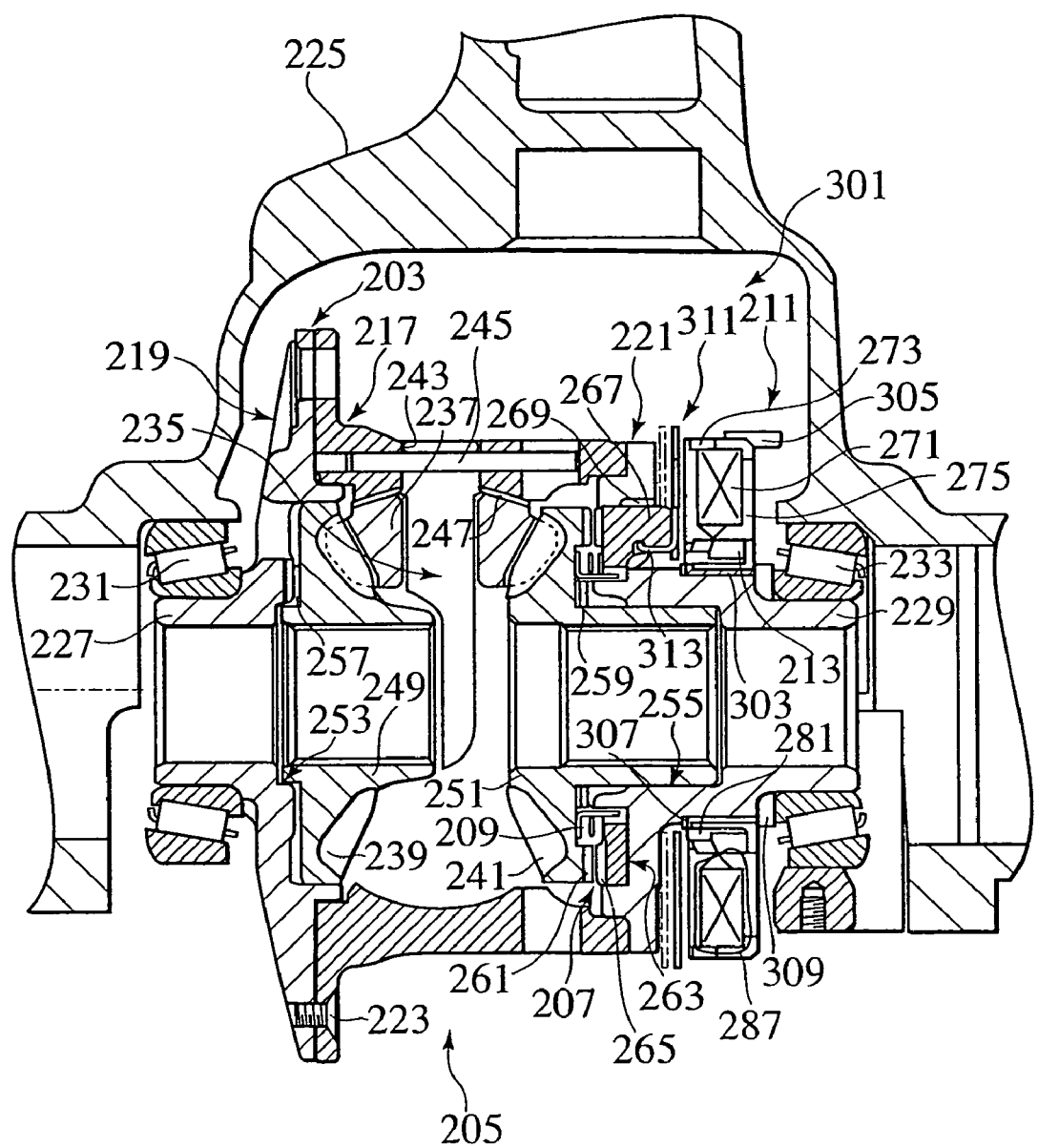
FIG. 8 is a cross-sectional view showing the differential mechanism according to a fifth embodiment of the present invention.

The fifth embodiment of the present invention will be described below with reference to FIG. 8. In this fifth embodiment, the same elements as the above embodiments are referenced with the same numerals and the detailed descriptions are omitted. Mainly differences are described below.

A differential gear mechanism 301 of this embodiment differs from the differential gear mechanism 201 of the fourth embodiment in that the supporting structure of the electromagnet 211 is changed.

The same numerals are given to the members having the function identical to the differential gear mechanism 201, and then, the different point will be described below with reference to these.

The electromagnet 211 is supported to the outer periphery of the right boss portion 229 of the case 203 via a sliding bearing 303 made of non-magnetic material, and is coaxially positioned. Further, the electromagnet 211 is connected to the differential carrier 225 side via the bracket 305, and is locked.

The electromagnet 211 is positioned in the axial direction by a snap ring 307 on the boss portion 229 and the washer 309 arranged on the left side of the tapered roller bearing 233.

Further, the electromagnet 211 fixed to the boss portion 229 is arranged inside the projection range in the axial direction of the case 203.

The clutch ring 263 of the dog clutch 207 is connected with a retainer 311 by its arm 313. When the electromagnet 211 is excited, the magnetic loop 287 is generated in the magnetic path, and then, the plunger 213 pushes the clutch ring 263 to the left side via the retainer 311. By doing so, the dog clutch 207 is engaged so that the differential motion of the differential gear set 205 can be locked.

On the other hand, when the excitation to the electromagnet 211 is stopped, the clutch ring 263, the retainer 311 and the plunger 213 are returned back to the right side by the return spring 209, so that the engagement of the dog clutch 207 and the differential lock can be released.

In general, in the case of fixing the electromagnet (electromagnetic actuation means) to the differential carrier and locking it, when the case moves with backlash adjustment of the ring gear fixed to the case and another gear, or by assembling error, a fluctuation occurs in the distance between the case side clutch and the differential carrier side electromagnet.

Thus, in the electromagnet stroke, a margin is required for absorbing the fluctuation in the distance between the electromagnet and the case side clutch. For this reason, the working force of the electromagnet must be made large; as a result, the electromagnet becomes a large size and heavy, and the cost increases, and in addition, a vehicle assembly performance of the differential gear mechanism is reduced.

Further, the electromagnet is made into a large size, and thereby, power consumption increases; for this reason, a load to the battery becomes high, and finally, a fuel consumption of engine is reduced.

Further, the electromagnet is made into a large size, and thereby, the bracket for fixing the electromagnet to the differential carrier needs to have a considerable high strength; as a result, the bracket becomes heavy, and the cost increases.

Further, in the case where the electromagnet is fixed and locked on the differential carrier side, there is a need of adjusting a relative position between the electromagnet on the differential carrier side and the clutch on the case side; for this reason, assembling is difficult.

However, according to this fifth embodiment, in the differential gear mechanism 301 constructed as described above, the electromagnet 211 is fixed to the case 203. By doing so, even if backlash adjustment is made between the ring gear on the case 203 side and the power transmission system output gear engaging with the ring gear, or assembling error occurs, the electromagnet 211 is moved integrally with the case 203; therefore, no fluctuation occurs in the distance between the dog clutch 207 and the electromagnet.

Accordingly, there is no need of providing a margin for absorbing the above distance fluctuation in the stroke of the electromagnet 211, and making large the working force of the electromagnet 211. Thus, this serves to prevent the electromagnet 211 from becoming large size and heavy weight, an increase of cost, and a reduction of vehicle assembly performance of the differential gear mechanism 301.

Further, it is possible to prevent an increase of power consumption of the electromagnet 211, an increase of load to the battery, and a reduction of fuel consumption of engine.

Further, it is possible to carry out sufficient backlash adjustment between the ring gear of the case 203 and the output gear. Therefore, the engagement of these gears is normally made, and gear noise or vibration is prevented; as a result, durability can be improved.

Further, the bracket 305 merely locks the electromagnet 211 to the differential carrier 225; therefore, the bracket 305 requires neither function of fixing the electromagnet to the differential carrier 225 nor the strength in response to the function. As a result, it is possible to achieve weight reduction and cost reduction.

Further, the differential gear mechanism 301 has the structure in which the electromagnet 211 is fixed to the case 203 side, unlike the structure in which the electromagnet is fixed to the differential carrier. Therefore, there is no need of adjusting the relative position between the electromagnet on the differential carrier side and the clutch on the case side, and in order to lock the electromagnet, the bracket 305 may be only engaged with the differential carrier 225 in assembling. As a result, assembling is very easy.

Further, the electromagnet 211 is positioned coaxially to the case 203 via the sliding bearing 303; therefore, there is no need of providing the annular member 67 is provided in order to position the electromagnet 211 like the above first embodiment. As a result, the number of components and the cost can be reduced, and the structure can be simplified.

Further, the electromagnet 211 is fixed to the boss portion 229, and is arranged in the projection range in the axial direction of the case 203, and thereby, the space is effectively used. Therefore, the differential gear mechanism 301 can be made compact size, and a vehicle assembly performance can be further improved.

[Sixth Embodiment]

The sixth embodiment of the present invention is described hereinafter with reference to FIG. 9 to FIG. 13. In this sixth embodiment, the same elements as the above embodiments are referenced with the same numerals and the detailed descriptions are omitted. Mainly differences are described below.

The electromagnetic actuation means according to the sixth embodiment is an actuator 401 and is provided with an electromagnet 403 and a plunger 415.

Figure 9:
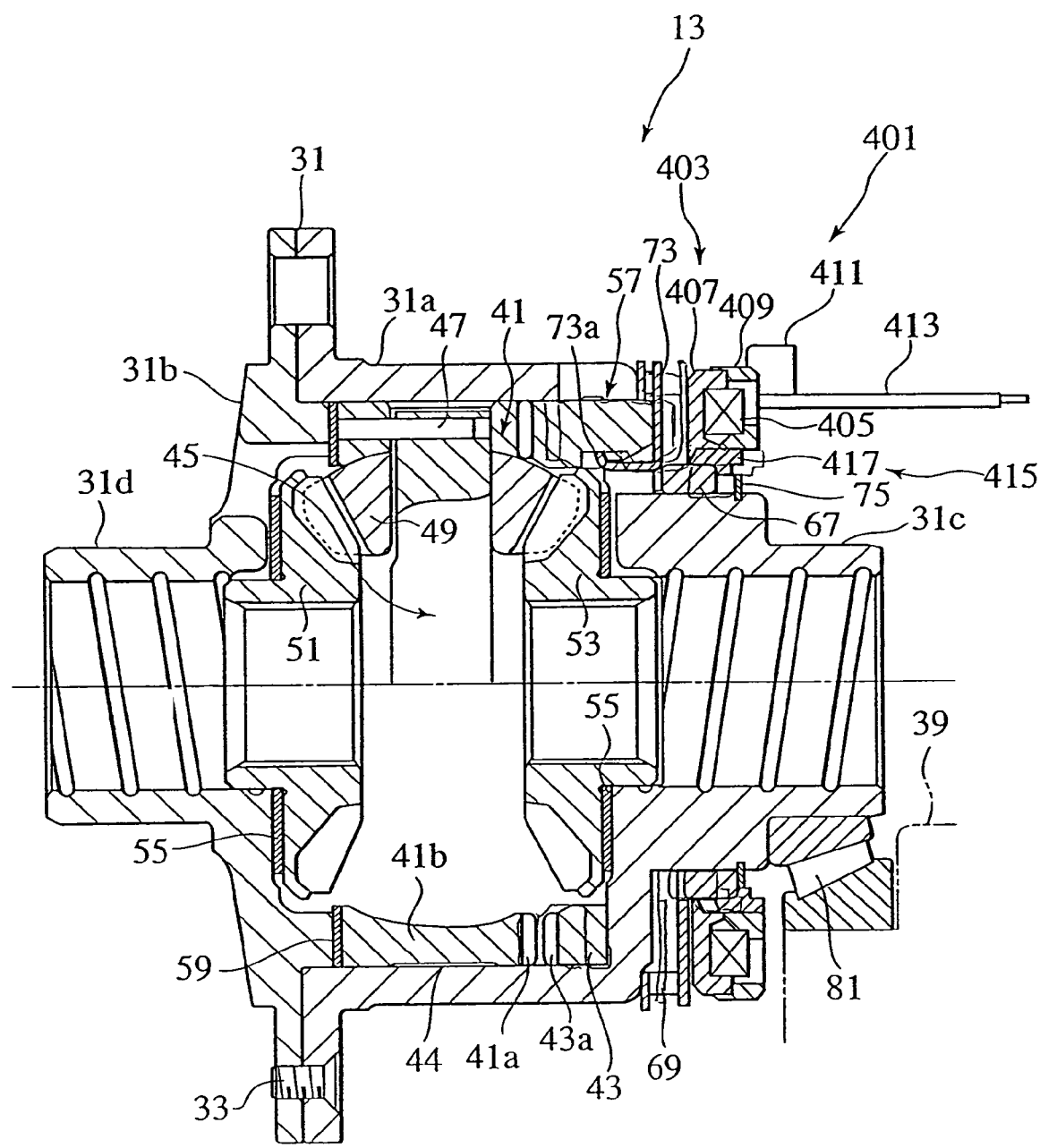
FIG. 9 is a cross-sectional view showing the differential mechanism according to a sixth embodiment of the present invention.

The electromagnet 403 includes a solenoid 405 and a pair of cores 407 and 409 integrally enwrapping the solenoid 405 from both sides. The core 409 shown in the right side of FIG. 9 is supported by a bracket 411 connected to a differential carrier (not shown). Wires 413 are conducted from the solenoid 405 and are connected with an in-vehicle battery via a controller.

A plunger 415 is provided with an permanent magnet 417 and a non-magnetic annular member 419 which is movably supported on the boss portion 31c of the outer case 31. The permanent magnet 417 is fixed to the outer periphery of the annular member 419 and is positioned in the inner periphery of the cores 407 and 409 with a moderate air-gap therebetween so that the permanent magnet 417 may move in the axis direction.

The permanent magnet 417 is positioned coaxially with the boss portion 31c via the annular member 419 thereby the gap between the permanent magnet 417 and the cores 407 and 409 is easy to be regulated. The gap is optimized so that its magnetic loss is minimized.

The cores 407, 409 and the plunger 415 compose a closed magnetic circuit. The annular member 419 composed of non-magnetic material is place in an inner periphery of the permanent magnet 417. Therefore magnetic loss by leakage of the magnetic field from the electromagnet 403 to the outer case 31 is minimized. Thereby the electric power to switch the driving mode is saved.

In a case where the vehicle's driving mode is switched from 2 WD to 4 WD, the controller (not shown) starts the excitation of the electromagnet 403 so that the dog clutches 41a and 43a are engaged with each other, and after that, the controller suspends the excitation. In case where the vehicle's driving mode is switched from 4 WD to 2 WD, the controller starts the reverse-polarized excitation of the electromagnet 403 so that the engagement of the dog clutches 41a and 43a is canceled, and after that, the controller suspends the excitation.

The upper half of FIG. 9 shows a 4 WD state which the dog clutches 41a and 43a are engaged with each other, and the lower half of FIG. 9 shows a 2 WD state which the engagement of the dog clutches 41a and 43a is canceled.

Figure 10:
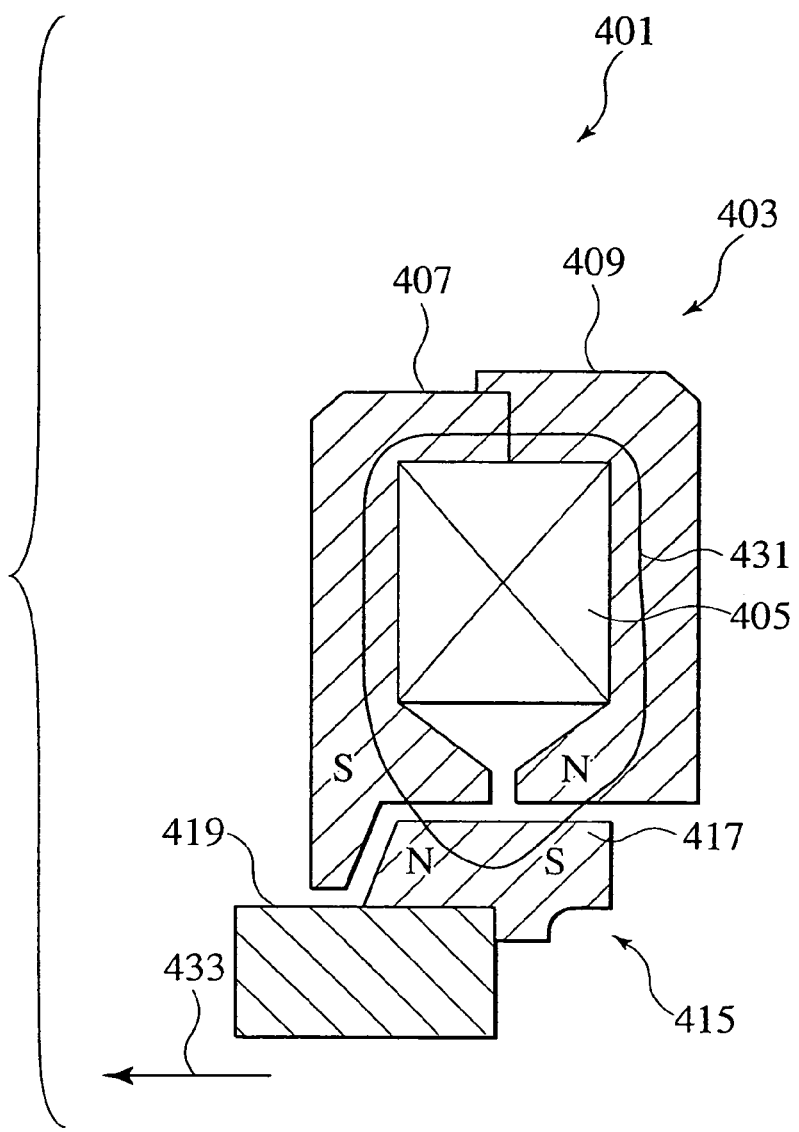
FIG. 10 is a cross-sectional view showing an excited state of the electromagnet according to the sixth embodiment of the present invention.

The excitation of the electromagnet 403 polarized as shown in FIG. 10 makes a magnetic loop 431 so that the plunger 415 moves to the left as an arrow 433 shown in FIG. 10 against the urging force of return spring 69. The plunger 415 drives the clutch 43 to the left thereby the dog clutches 43a and 45a are engaged with each other and the vehicle's driving mode is switched to 4 WD.

In a case where the excitation of the electromagnet 403 is suspended after the state described above, the magnetic force of the permanent magnet 417 keeps the position of the plunger 415 as it is where the dog clutches 43a and 45a are engaged with each other against the urging force of return spring 69 so that the vehicle's driving mode is kept 4WD.

Figure 11:
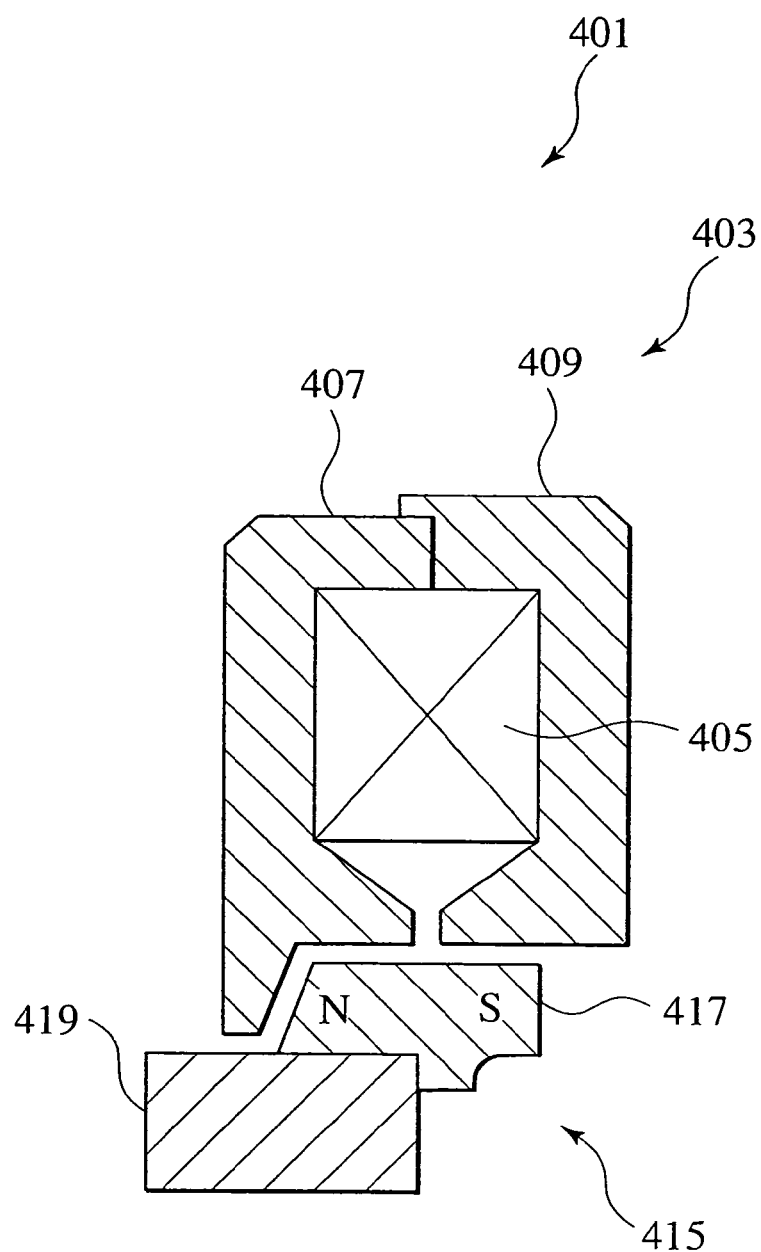
FIG. 11 is a cross-sectional view showing suspension of the electromagnet excitation after the state shown in FIG. 10 according to the sixth embodiment of the present invention.
Figure 12:
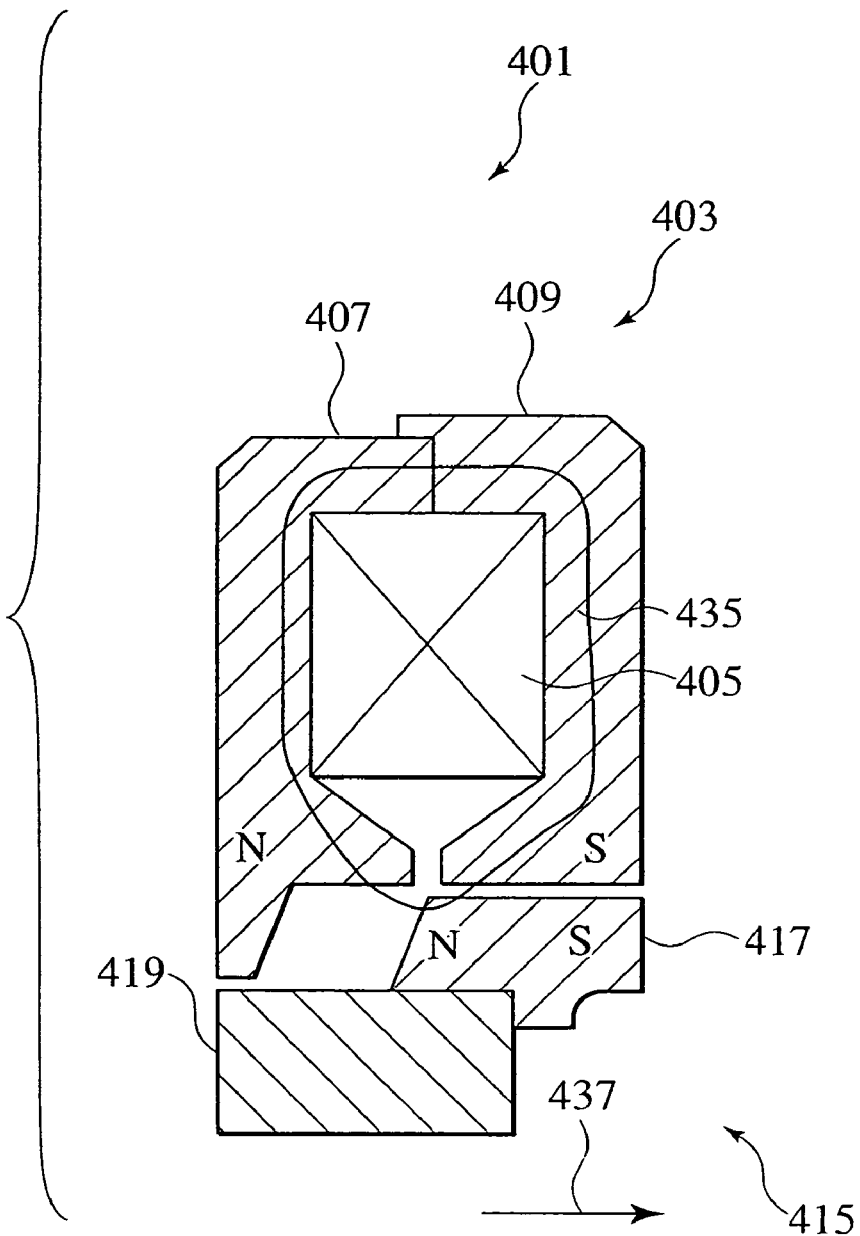
FIG. 12 is a cross-sectional view showing an excited state of the electromagnet whose excitation direction is reversed to the state shown in FIG. 10 according to the sixth embodiment of the present invention.

The excitation of the electromagnet 403 polarized reversely as shown in FIG. 12 after the state shown in FIG. 11 makes a magnetic loop 435 so that the plunger 415 moves to the right as an arrow 437 shown in FIG. 12. The plunger 415 drives the clutch 43 to the right thereby the engagement of the dog clutches 43a and 45a is canceled and the vehicle's driving mode is switched to 2 WD.

Figure 13:
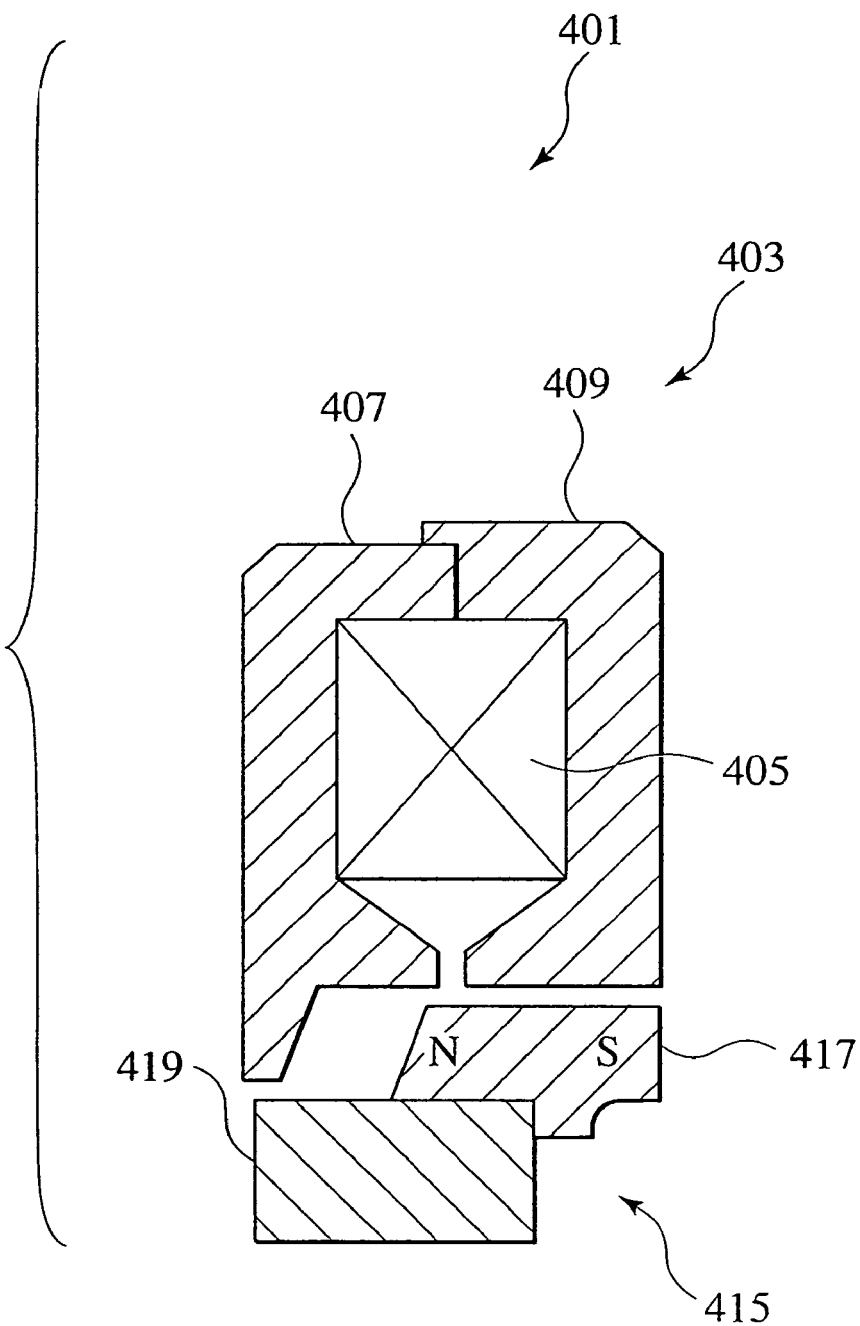
FIG. 13 is a cross-sectional view showing suspension of the electromagnet excitation after the state shown in FIG. 12 according to the sixth embodiment of the present invention.

In a case where the excitation of the electromagnet 403 is suspended after the state described above, the magnetic force of the permanent magnet 417 keeps the position of the plunger 415 as shown in FIG. 13 where the engagement of the dog clutches 43a and 45a is canceled so that the vehicle's driving mode is kept 2 WD.

As described above, the vehicle's driving mode of a 4 WD state or a 2 WD state is kept as it is by the permanent magnet 417 so that the electromagnet 403 is not needed to be kept excited. Therefore loads on the electromagnet 403 and the in-vehicle battery is reduced so that the fuel-efficiency is improved.

If the actuator 401 fails, the function of the permanent magnet 417 keeps the vehicle's driving mode in the 4 WD state or the 2 WD state. For the foregoing reason, there are few possibilities of occasion of the severe accident such as a crushing of the differential mechanism.

The return spring 69 which moves the plunger 415 backward may be omitted because the electromagnet 403 can drives the plunger 415 to both the engagement position and the engagement canceling position of the dog clutches. Thereby the number of the components and the cost may be reduced.

The contents of Japanese Patent Applications No. 2001-113881 (filed Apr. 12, 2001), No. 2001-343262 (filed Nov. 8, 2001), No. 2001-53741 (filed Feb. 28, 2002) and No. 2001-354370 (filed Nov. 20, 2001) are incorporated herein by reference.

Although the invention has been described above by reference to certain embodiments of the invention, the invention is not limited to the embodiments described above. Modifications and variations of the embodiments described above will occur to those skilled in the art, in light of the above teachings. For example, though dog clutches are applied in the embodiments described above, a friction clutch such as a single or multiple disk clutch or a cone clutch may be applied. Moreover the polarization of the plunger 415 made of a permanent magnet may be reversed from the case described above. The differential gear mechanism according to the present invention may be applied to any of a front differential, a rear differential and a center differential.

What is claimed is:

1. A differential gear mechanism, comprising:
a case being capable of rotation driven by a power source around a rotation axis;
a differential gear set housed in and drivingly coupled to the case, the differential gear set including first and second output gears and being configured to differentially transmit the rotation of the case to the first and second output gears;
a clutch operable to limit and free a differential motion between the first and second output gears;
an annular plunger being movable in a direction of the rotation axis and configured to operate the clutch;
an annular member fitted to the plunger and intervening between the plunger and the clutch; and
an annular electromagnetic actuator configured to actuate the plunger in the direction of the rotation axis, the annular electromagnetic actuator comprising an annular solenoid and a core surrounding the solenoid to leave a gap, the gap being spanned by the plunger such that the core and the plunger form a closed magnetic circuit,
wherein the case further comprises a pair of boss portions supporting the output axes rotatably and the annular member is positioned coaxially with the clutch by one of the boss portions.

2. The differential gear mechanism of claim 1, further comprising:
a spring configured to apply a force to the annular member in a counter direction to a driving direction of the electromagnetic actuator.

3. The differential gear mechanism of claim 2, wherein the annular member is made of nonmagnetic material.

4. The differential gear mechanism of claim 2, wherein the plunger is positioned coaxially with the clutch by the annular member.

5. The differential gear mechanism of claim 1, wherein the electromagnetic actuator is rotatably supported by the case; the case is rotatably housed in a differential carrier; and the electromagnetic actuator is stopped rotating by the carrier.

6. The differential gear mechanism of claim 5, wherein the case further comprises a pair of boss portions rotatably supported by the differential carrier; and
the electromagnetic actuator is supported by one of the boss portions and is positioned within a range where an outer periphery of the case is elongated in a direction of the output axes.

7. The differential gear mechanism of claim 1, wherein the gap is positioned in an inner periphery of the electromagnetic actuator and the plunger is slidably fitted in the inner periphery of the electromagnetic actuator.

8. The differential gear mechanism of claim 1, wherein:
the plunger is a permanent magnet magnetized in a driving direction of the plunger and is selectively driven between a first position and a second position by a current applied to the solenoid; and
the clutch limits the differential motion when the plunger is at the first position and frees the differential motion when the plunger is at the second position.

9. The differential gear mechanism of claim 8, wherein:
the plunger keeps its position by a magnetic force of the plunger when the current applied to the solenoid is cut.

10. A differential gear mechanism, comprising:
a case being capable of rotation driven by a power source around a rotation axis;
a differential gear set housed in and drivingly coupled to the case, the differential gear set including first and second output gears and being configured to differentially transmit the rotation of the case to the first and second output gears;
a clutch operable to limit and free a differential motion between the first and second output gears;
an annular plunger being movable in a direction of the rotation axis and configured to operate the clutch;
an annular electromagnetic actuator configured to actuate the plunger in the direction of the rotation axis, the annular electromagnetic actuator comprising a core and a solenoid fitted to the core;
an annular member of nonmagnetic material configured to transmit movements of the plunger to the clutch, the annular member being fitted to the plunger; and a spring configured to apply a force to the annular member in a counter direction to a driving direction of the electromagnetic actuator, wherein the plunger fits with the core such that a magnetic loop is constantly closed within the plunger and the cord.

11. The differential gear mechanism of claim 10, wherein the annular member intervenes between the plunger and the clutch.

12. An actuator for actuation of an axially operable part configured to connect and disconnect relatively rotating members, the actuator comprising:

an annular solenoid;

an annular core surrounding the solenoid to leave a gap; and an annular plunger driven by the solenoid to actuate the axially operable part, the plunger being coaxially and movably fitted to the core and spanning the gap of the core such that the core and the plunger form a closed magnetic circuit, wherein the plunger is a permanent magnet magnetized in the direction where the solenoid drives the plunger and is selectively driven between a first position and a second position by a current applied to the solenoid.

13. The actuator of claim 12, wherein the annular member is made of nonmagnetic material.

14. The actuator of claim 12, wherein the solenoid, the core and the plunger are coaxially disposed and so dimensioned as to coaxially couple with the relatively rotating members.

15. The actuator for actuation of an axially operable part configured to connect and disconnect relatively rotating members, the actuator comprising:

an annular solenoid;

an annular core surrounding the solenoid to leave a gap;

an annular plunger driven by the solenoid and coaxially and movably fitted to the core;

an annular member of nonmagnetic material configured to transmit movements of the plunger to the axially operable part, the annular member being fitted to the plunger; and a spring configured to apply a force to the annular member in a counter direction to a direction where the solenoid drives the plunger, wherein the plunger fits with the core such that a magnetic loop is constantly closed within the plunger and the core.

16. The actuator of claim 15, wherein the solenoid, the core, the plunger and the annular member are coaxially disposed and so dimensioned as to coaxially couple with the relatively rotating members.

* * * * *

UNITED STATES PATENT AND TRADEMARK OFFICE
CERTIFICATE OF CORRECTION

PATENT NO. : 7,074,150 B2  
APPLICATION NO. : 11/202922  
DATED : July 11, 2006  
INVENTOR(S) : Masaaki Fusegi et al.

Page 1 of 1

It is certified that error appears in the above-identified patent and that said Letters Patent is hereby corrected as shown below:

On Title page item should read

(73) Assignee: Tochigi Fuji Sangyo Kabushiki Kaisha, Tochigi-shi, JAPAN.

Signed and Sealed this

Twentieth Day of May, 2008

JON W. DUDAS  
*Director of the United States Patent and Trademark Office*